United States Patent Office 3,375,106
Patented Mar. 26, 1968

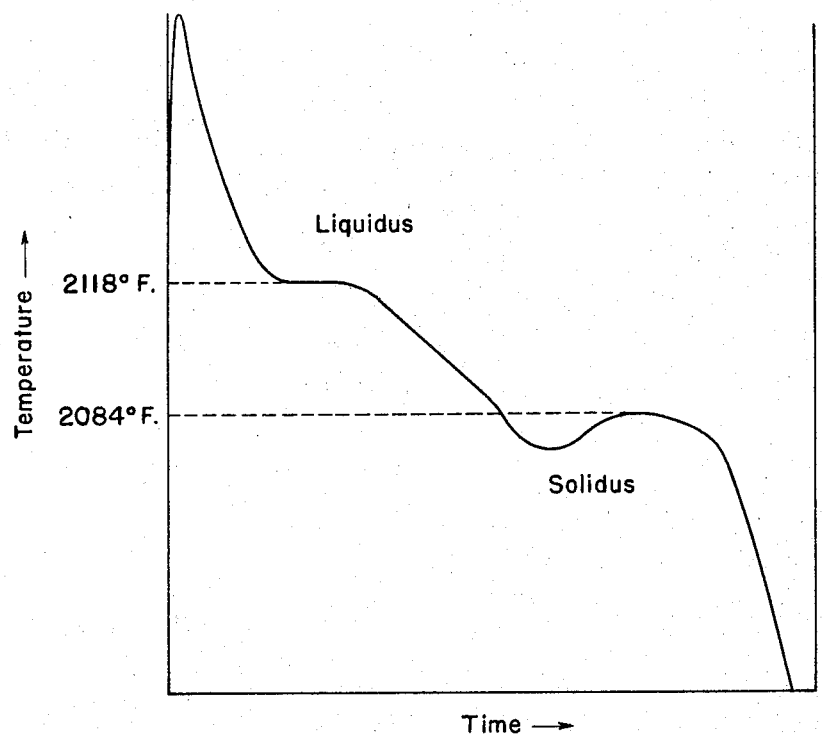

3,375,106
DETERMINATION OF CARBON EQUIVALENCE OF HYPEREUTECTIC CAST IRON
Dale C. McKissick, Anchorage, and James H. Bauer, Louisville, Ky., assignors to American Standard Inc., a corporation of Delaware
Filed Feb. 2, 1965, Ser. No. 429,869
4 Claims. (Cl. 75—130)

ABSTRACT OF THE DISCLOSURE

A sample of hypereutectic iron is made hypoeutectic so that the carbon equivalence can be determined by conventional thermal analysis techniques. A relatively pure iron additive is added to the hypereutectic iron sample by melting the sample and the additive and mixing them together. The hypereutectic iron is thus converted to hypoeutectic iron and the molten mixture is permitted to cool and the cooling curve recorded. The carbon equivalence of the mixture is determined by the means of the thermal arrest technique.

---

This invention relates to a method for determining the carbon equivalence (hereinafter referred to as CE) of cast iron. It particularly relates to a relatively rapid method for determining the CE of hypereutectic cast iron.

The chemical composition of iron is an important factor in producing iron castings of high quality. The CE term is a measure of the combined effects of carbon, silicon and phosphorus, expressed as percent C+⅓ (percent Si+percent P). Since the phosphorus variation is relatively small in many melting operations, a knowledge of the carbon and silicon contents is sufficient for the satisfactory control of the CE of iron.

While chemical analysis may be used for the determination of the CE, a more rapid and convenient test for determining the CE is based on measuring the temperature of the liquidus and solidus arrests of a sample of molten iron.

In practice an expendable cup with a built-in thermocouple for measuring the temperature is used for such determinations. A suitable form of such cup is the Tectip marketed by the Leeds & Northrup Co. The Tectip has suitable electrical connections so that the device is operated by simply plugging into a holder that is connected to an instrument that records the cooling curve as the sample freezes.

FIG. 1 illustrates a cooling curve.

While the test employing the liquidus and solidus arrest temperatures for determining the CE is useful when working with hypoeutectic cast iron, it does not give satisfactory results when used on eutectic or hypereutectic cast iron; that is iron having a CE equal to or greater than eutectic composition. When a sample of hypereutectic cast iron is tested by this method the CE cannot be readily determined because there is no easily detectable liquidus arrest when such molten sample is allowed to cool.

In accordance with this invention there is provided a convenient and accurate method for determining the CE of a hypereutectic cast iron which comprises mixing a suitable diluent additive with the sample of hypereutectic cast iron prior to testing. The addition of a diluent serves to alter the composition so that the sample becomes hypoeutectic and cooling curve analysis can be performed in the conventional manner.

In carrying out the test according to the method of this invention a calibrated amount of the diluent additive is placed in the sample cup, and a molten hypereutectic cast iron sample is poured into the cup to a predetermined level. The mixture is then stirred until the diluent additive has melted. Preferably, a low carbon steel probe is used both to stir the mixture and to determine when the melt is complete. The small amount of steel picked up from the probe is negligible. As soon as the melt is complete cooling curve analysis is carried out in the conventional manner. The CE is determined from the following Gray Iron Research Institute table.

CARBON EQUIVALENT OF GRAY CAST IRONS (HYPOEUTECTIC) BY SOLIDIFICATION THERMAL ARREST TEMPERATURES (° F.)

| CE | Liquidus Temp., ° F. | CE | Liquidus Temp., ° F. |
|---|---|---|---|
| 3.60 | 2,250 | 3.98 | 2,174 |
| 3.61 | 2,248 | 3.99 | 2,172 |
| 3.62 | 2,246 | 4.00 | 2,170 |
| 3.63 | 2,244 | 4.01 | 2,168 |
| 3.64 | 2,242 | 4.02 | 2,166 |
| 3.65 | 2,240 | 4.03 | 2,164 |
| 3.66 | 2,238 | 4.04 | 2,162 |
| 3.67 | 2,236 | 4.05 | 2,160 |
| 3.68 | 2,234 | 4.06 | 2,158 |
| 3.69 | 2,232 | 4.07 | 2,156 |
| 3.70 | 2,230 | 4.08 | 2,154 |
| 3.71 | 2,228 | 4.09 | 2,152 |
| 3.72 | 2,226 | 4.10 | 2,150 |
| 3.73 | 2,224 | 4.11 | 2,148 |
| 3.74 | 2,222 | 4.12 | 2,146 |
| 3.75 | 2,220 | 4.13 | 2,144 |
| 3.76 | 2,218 | 4.14 | 2,142 |
| 3.77 | 2,216 | 4.15 | 2,140 |
| 3.78 | 2,214 | 4.16 | 2,138 |
| 3.79 | 2,212 | 4.17 | 2,136 |
| 3.80 | 2,210 | 4.18 | 2,134 |
| 3.81 | 2,208 | 4.19 | 2,132 |
| 3.82 | 2,206 | 4.20 | 2,130 |
| 3.83 | 2,204 | 4.21 | 2,128 |
| 3.84 | 2,202 | 4.22 | 2,126 |
| 3.85 | 2,200 | 4.23 | 2,124 |
| 3.86 | 2,198 | 4.24 | 2,122 |
| 3.87 | 2,196 | 4.25 | 2,120 |
| 3.88 | 2,194 | 4.26 | 2,118 |
| 3.89 | 2,192 | 4.27 | 2,116 |
| 3.90 | 2,190 | 4.28 | 2,114 |
| 3.91 | 2,188 | 4.29 | 2,112 |
| 3.92 | 2,186 | 4.30 | 2,110 |
| 3.93 | 2,184 | 4.31 | 2,106 |
| 3.94 | 2,182 | 4.32 | 2,102 |
| 3.95 | 2,180 | 4.33 | 2,098 |
| 3.96 | 2,178 | 4.34 | 2,094 |
| 3.97 | 2,176 | 4.35 | 2,090 |

A correction must then be added to compensate for the dilution caused by the diluent, said correction being determined mathematically from the weights of diluent additive and an average hypereutectic cast iron sample. The correction is charted for ease in use.

In carrying out the determination the diluent additive is preferably placed around the thermocouple. This serves to protect the themocouple from burnout when the molten hypereutectic cast iron is added.

The diluent additive is a steel with carbon as low as obtainable, i.e. about 0.1% carbon. The diluent additive can be used in several forms, such as, for example, steel wool, which may, if desired, be pressed into a size and shape suitable to fit the sample cup, sheet-steel cylinders or spiralled-sheet-steel cylinders. Preferably, the diluent additive is a steel wire coil. The wire in this coil should be fine enough to melt easily and coarse enough to be fabricated into a shape of a weight sufficient to achieve the required dilution. The use of a wire coil is advantageous in that the wire is readily fabricated, easy to adjust to the desired weight, and inexpensive.

The invention will appear more fully from the example which follows. This example is set forth by way of illustration only, and it will be understood that the invention is not to be construed as limited by the details therein, as many modifications in materials, apparatus and methods will be apparent from this disclosure, to those skilled in the art.

(A) Determination of the amount of diluent additive to be added to achieve a given change in the CE The final CE of the sample plus the diluent additive is given by the equation $$C_c = \frac{(\text{Percent } S)(CE) + (\text{Percent } A)(C_A)}{100}$$

where

CE=CE of the sample
$C_c$=Final CE (sample and diluent additive)
$C_A$=CE of the diluent additive
Percent A=percent by weight of diluent additive
Percent S=percent by weight of iron sample since $$\text{Percent } S = 100 - \text{Percent } A$$

$$\text{Percent } A = \frac{100(CE - C_c)}{(CE - C_A)}$$

To find the amount of diluent additive which must be added to obtain a desired shift in the CE the appropriate values are substituted. For example, to achieve a shift in the CE from 4.60 to 4.30 with a test casting having a total weight of 500 grams, the percentage of diluent additive with a $C_A$ of 0.15 will have to be 6.75%. Therefore, about 33.7 grams of diluent additive will have to be added to 500 grams of the hypereutectic cast iron to achieve the desired shift. This is equivalent to a shift of 0.05% in the CE for every 5.6 grams of cast iron. Once this calculation has been made, it need never be done again, and the desired shift in the CE can be obtained by adding a previously fabricated coil of diluent additive of the weight needed to obtain the desired shift. Although a slightly different percent A will be calculated for high and low CE's, such as 4.40 and 4.80, it is not necessary to calculate percent A for these as well. The value of 6.75% as calculated for 4.60 is well within the limits of experimental accuracy and will result in a correct CE determination for a range of, e.g., CE's from 4.40 to 4.80. For example a table of values may be constructed as follows:

| Wt. of diluent additive, grams: | Shift in CE |
|---|---|
| 5.6 | 0.05 |
| 11.2 | 0.10 |
| 16.8 | 0.15 |
| 33.7 | 0.30 |

(B) Determination of CE of a sample of hypereutectic cast iron from the determination of the CE of a sample of the cast iron plus diluent additive On 33.7 grams of a coil of low carbon steel (about 0.1% carbon) in a Tectip was poured a molten sample of hypereutectic cast iron. The steel additive melted and a temperature of about 2300° F. was indicated on the recorder. The molten cast iron was poured to a predetermined level. The cooling curve as shown in FIG. 1 was then recorded. The upper thermal arrest (liquidus) was read in about the middle of the flat portion of the curve. The liquidus temperature was 2,118° F. The lower thermal arrest (solidus) was read on the maximum after the undercooling (minimum). The solidus temperature was 2,084° F. From tables prepared by the Gray Iron Research Institute it was found from either the liquidus temperature or the difference between liquidus or solidus temperatures that the CE of the sample of cast iron plus diluent additive was 4.25. From the calculation of change of CE resulting from the addition of specified amounts of diluent additive it is known that the addition of 33.8 grams of diluent additive will result in a drop of 0.30% in the CE. The CE of the sample of hypereutectic cast iron was, therefore, 4.25 plus 0.30 or 4.55.

What is claimed is:
1. A method for determining the carbon equivalence of hypereutectic cast iron comprising the steps of:
   (a) melting a sample of hypereutectic cast iron,
   (b) melting a relatively low carbon diluent additive,
   (c) mixing said sample of hypereutectic cast iron with a sufficient quantity of said diluent additive to form a molten sample of hypoeutectic cast iron, and
   (d) measuring and recording the temperature of said hypoeutectic cast iron while said hypoeutectic iron solidifies, whereby the carbon equivalence is determined from the liquidus and solidus arrest temperatures.

2. The method of claim 1, wherein said diluent additive comprises steel containing up to about 0.1 carbon.
3. The method of claim 2, wherein said steel is in the form of steel wool.
4. The method of claim 2, wherein said steel is in the form of a coiled spring.

References Cited

Mellon, "Analytical Absorption Spectroscopy," 1953, John Wiley and Sons, page 110.

Humphreys, article in "BCIRA Journal," vol. 9, 1961, pages 609–613, 616, and 618.

Jelley and Humphreys, article in "BCIRA Journal," vol. 9, 1961, pages 622–625, 629–631.

Redshaw et al., article in "Foundry Trade Journal," Aug. 30, 1962, pages 247, 251.

DAVID L. RECK, *Primary Examiner.*

H. W. TARRING, *Assistant Examiner.*